United States Patent
Griffin et al.

(10) Patent No.: US 7,612,767 B1
(45) Date of Patent: Nov. 3, 2009

(54) TRACKPAD PEN FOR USE WITH COMPUTER TOUCHPAD

(75) Inventors: Paul Griffin, Nashville, TN (US); Cameron Boone, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 683 days.

(21) Appl. No.: 11/210,974

(22) Filed: Aug. 24, 2005

(51) Int. Cl.
*G06F 3/033* (2006.01)

(52) U.S. Cl. .................................. 345/179; 178/19.03

(58) Field of Classification Search ................. 345/179, 345/180, 182; 364/550; 178/19.03, 19.01, 178/19.06
See application file for complete search history.

(56) References Cited

U.S. PATENT DOCUMENTS

| | | | | |
|---|---|---|---|---|
| 5,365,461 A | * | 11/1994 | Stein et al. .................. | 700/298 |
| 5,528,002 A | * | 6/1996 | Katabami .................. | 178/19.06 |
| 5,790,106 A | * | 8/1998 | Hirano et al. ................ | 345/173 |
| 5,945,980 A | * | 8/1999 | Moissev et al. ............. | 345/173 |
| 6,262,580 B1 | * | 7/2001 | Wu ............................. | 324/713 |
| 2005/0162411 A1 | * | 7/2005 | Berkel van .................. | 345/179 |

* cited by examiner

*Primary Examiner*—Chanh Nguyen
*Assistant Examiner*—Tsegaye Seyoum
(74) *Attorney, Agent, or Firm*—Hornkohl Intellectual Property Law PLLC; Jason L. Hornkohl

(57) ABSTRACT

A pen or stylus for use with a finger activated computer touchpad uses capacitively coupled voltage signals to simulate the capacitive effect of a finger on the touchpad. In addition, the pen has buttons that can be utilized to capacitively couple control signals to the touchpad that are interpreted by application software as specific user-defined inputs. The pen has a conductive tip that is placed into contact with the touchpad. By biasing the touchpad electrodes with a properly timed voltage signal, the pen alters the charging time of the electrodes in the touchpad. This alteration in charging time is interpreted by the touchpad as a change in capacitance due to the presence of a user's finger. Thus, the pen can be used with touchpads that were designed to only detect finger movements.

6 Claims, 3 Drawing Sheets

TRACKPAD PEN FOR USE WITH COMPUTER TOUCHPAD

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention is generally related to the field of computer peripherals. More particularly, the present invention is directed toward a pen for use with a touchpad that simulates the capacitance of a human finger.

BACKGROUND OF THE INVENTION

A variety of different types of devices are used to enable a user to communicate with a computer. Perhaps the most common devices are the keyboard and the computer mouse. However, in recent years, touchpad sensing technologies have gained in popularity. These touchpads allow a user to control the cursor or select an option on a computer screen by touching the touchpad with their finger. There several different designs for these touchpads. One of the most popular designs is based on capacitive touchpad technology. The basic principle behind the operation of capacitive touchpad technology is the electrical phenomenon referred to as capacitance. Any two electrical conductors separated by an insulator, such as air, form a capacitor. The two conductors interact with each other by means of their electric fields and for a given potential difference, or voltage between the two conductors, a certain amount of electric charge will be present at the conductor surfaces nearest each other. One conductor will have a net positive charge, and the other conductor will have a net negative charge of equal magnitude but opposite sign. For a given physical arrangement of the two conductors, and fixed properties for the insulating material, the relationship between the voltage between the conductors and the net charge on the conductors is a constant called the capacitance. The capacitance is not dependent on the voltage between the conductors or on the charge, but rather gives the relationship between the two for a given system geometry and insulating material. This relationship can be expressed equation form as:

$$Q = C^*V \quad (1)$$

where Q is the magnitude of charge on each conductor in Coulombs, V is the voltage between the conductors in Volts, and C is the capacitance of the two-conductor system in Farads. When two conductors are oriented such that the distance between them is relatively constant over the surface area of the conductors, and this distance is very small when compared to the area of the conductors, the capacitance can be approximated by the formula:

$$C = \in^* A/d \quad (2)$$

Here C is the capacitance in Farads, d is the separation between the conductors in meters, A is the area of the conductors in square meters, and $\in$, the dielectric constant, is a constant associated with the properties of the insulating medium between the conductors, and has units of Farads per meter.

Capacitive touchpads work due to the highly conductive nature of the human body. The fundamental structure of touchpads involves an x-y grid of wires on the top two layers of a printed circuit board. A mixed signal ASIC on the bottom side of the board along with other electronics interface to the grid of wires and perform computations to determine finger placement and pressure. A thin insulator, typically Mylar, is placed over the top surface of the grid to provide the dielectric for the capacitance as well as mechanical protection and isolation. When there is no contact with the touchpad, the nearest conductor to the electrodes is relatively far away, and the capacitance measured at each electrode is thus very low. When a human finger is placed on the pad surface, there is now a higher capacitance present between the finger and the nearby electrodes, due to the conductive nature of the finger and the close proximity of the finger to the pad (decrease in d from equation 2). This increase in capacitance at the nearest electrodes is detected by the touchpad control circuitry and used to calculate finger position, and also finger pressure on the touchpad. As a user presses harder on the touchpad surface, more of the finger's surface area is placed directly over the grid electrodes resulting in a larger capacitance, due to an increase in A from equation 2, which is interpreted by the touchpad electronics as a higher pressure reading.

The touchpad controller measures the capacitance at each electrode position by sending a periodic AC current signal at a fixed frequency and amplitude to each electrode and then, during each cycle interval, measuring the charging time of the resulting AC voltage signals. These voltage signals are small in amplitude, typically no more than a few hundred millivolts, and are similar to sinusoids in that they have 50% duty cycle. The relationship between the current "through" and voltage across a capacitor as seen in equation form is:

$$I = C^* dV/dt \text{ or } I^* dt = C^* dV \quad (3)$$

Thus for a given charging current, the time required to charge a capacitance to an incremental change in voltage is directly proportional to the magnitude of that capacitance. Each cycle, the touchpad electronics send a known AC current to each electrode capacitance and then measure the time required for the voltage across each electrode to increase to a certain threshold voltage. When the capacitance at an electrode is increased this time interval will increase. The touchpad ASIC detects this change and interprets the capacitance increase as the presence of a finger at the appropriate touchpad coordinates.

Unfortunately, capacitive touchpad do not work well with pens or stylus because these devices do not have a capacitance that is comparable to a human finger. Thus, touchpads are typically designed for use with either a pen-like object or the finger of an individual, but not both.

BRIEF SUMMARY OF THE INVENTION

An embodiment of the present invention is directed toward an approximately pen-shaped device for use with a computer touchpad wherein the computer touchpad is configured to be manipulated by a finger of a user. The device includes an emulator circuit for interacting with the computer touchpad such that the touchpad interprets contact between the device and the touchpad in the same manner as contact between an individual's finger and the touchpad by simulating a capacitive effect of a human finger being placed on the touchpad. The emulator circuit simulates the capacitive effect of a human finger being placed on the touchpad by capacitively coupling negative voltage transitions to touchpad electrodes beneath a touchpad surface. The negative voltage transitions are aligned such that they occur just before rising edges of an internal touchpad AC voltage signal. The negative voltage transition is preferably a transition from approximately +40V to 0V that occurs in approximately less than 1 µs. The touchpad contains electrodes and a tip of the device is adapted to be capacitively coupled to the electrodes such that the device can receive signals from the electrodes and transmit signals to the electrodes. A computer monitoring the touchpad contains software that allows the computer to decode signal sequences coupled from the device to the touchpad.

Another embodiment of the present invention is directed toward a pen-shaped stylus for use with a touchpad type computer input device being monitored by a computer. The touchpad type computer input device is adapted to detect the presence of a human finger. The stylus has a conductive tip that is adapted to capacitively couple signals from the stylus to the touchpad such that the signals imitate an effect of a human finger being placed into contact with the touchpad. The tip is biased to a predetermined voltage. A transceiver circuit in the stylus transmits signals to the conductive tip and receives signals from the capacitive tip. The signals include control signals that are interpreted as control signals by application software residing in the computer. A pulse generation and timing circuit in the stylus generates a pulse that is interpreted by the touchpad as being indicative of a human finger being placed into contact with the touchpad when detection circuitry in the stylus detects a voltage transition in the touchpad. The stylus preferably includes at least one button wherein the button produces control signals that are coupled to the touchpad and the control signals are interpreted by the computer monitoring the touchpad based upon application software being utilized by the computer.

Yet another embodiment of the present invention is directed toward a method of communicating information to a touchpad adapted to sense a position of a human finger in contact with the touchpad. In accordance with the method an electrical signal is produced with an approximately pen-shaped hand held device that the touchpad interprets as a human finger being placed into contact with the touchpad. The electronic signal is capacitively coupled to the touchpad. Control signals may also be capacitively coupled to the touchpad. In such an embodiment, application software residing in the computer is used to decode the control signals.

DETAILED DESCRIPTION OF THE INVENTION

Figure 1:
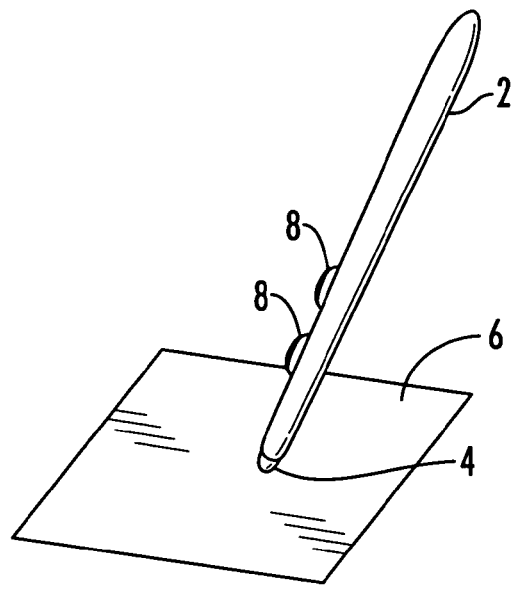
FIG. 1 is an illustration of a trackpad pen constructed in accordance with an embodiment of the present invention.

Referring now to FIG. 1, a human-computer interface device, the Trackpad Pen 2, constructed in accordance with an embodiment of the present invention is shown. The Trackpad Pen 2 is primarily intended for use with laptop computers featuring capacitive touchpad sensing technology to allow a user a novel way to input information and interact with a laptop computer. By simulating the capacitive effect of a finger in contact with a touchpad, the Trackpad Pen 2, when its tip 4 is placed in contact with a touchpad 6, causes the touchpad's built in intelligence to think that a finger is present on the pad. This allows the user to perform scrolling operations with the Trackpad Pen 2, as if a finger were present on the touchpad.

In addition, the Trackpad Pen 2 features buttons 8 that function much like the click-inputs on computer mice. The functions associated with these buttons 8 are user-programmable to allow functions such as left-click, right-click, click-and-drag etc. Thus, the Trackpad Pen 2 functions, much like a computer mouse, as a human-computer interface device that supports a wide range of programmable input functions and scrolling capability. The Trackpad Pen 2 also features automatic startup and shutdown, such that the pen 2 will automatically turn on after it has been placed in contact with the touchpad 6 (assuming the laptop is on and awake) for a specified period of time, and will automatically shut itself off after it has been taken off of the touchpad 6 for a specified period of time. As discussed in more detail herein, both the startup and shutdown time intervals are preferably adjustable in the pen's firmware.

The electronics in the Trackpad Pen 2 simulate the capacitive effect of a human finger being placed on the touchpad 6 which allows the pen to be used to manipulate a touchpad and thereby produce cursor movement. In addition, the Trackpad Pen buttons 8 can capacitively couple signals to the touchpad to allow for specific user-defined inputs. In essence, the Trackpad Pen works by capacitively coupling negative voltage transitions to the nearby touchpad electrodes beneath the touchpad surface and aligning these negative voltage transitions such that they occur just before the rising edges of the touchpad's internal AC voltage signal. An example of a negative voltage transition generated by the Trackpad Pen is a transition from +40V to 0V in less than 1 µs. For optimal performance, the negative voltage transition should be placed just before the rising edge of the AC voltage signal, as closely as possible, without actually overlapping the rising edge. As proper alignment between the two signals decreases such that the negative transition occurs further ahead of the rising edge, pen 2 performance progressively degrades. If the misalignment is severe enough, it will eventually result in the pen 2 not working at all. The Trackpad Pen is preferably powered from a battery 20.

The result of proper alignment is that when the touchpad's nearby electrode capacitances are charged they begin charging from a lower initial voltage, due to the negative voltage transitions coupled from the pen 2 through the surface of the touchpad. Thus, given a fixed current, a longer time interval will be required for the touchpad 6 to charge these capacitances to the threshold voltage. From equation (3), for a given current, I, and capacitance, C, dV has increased and, therefore, dt will increase. This increase in charging time is interpreted by the touchpad 6 as an increase in the nearby electrodes' capacitance. In this way, the Trackpad Pen 2 simulates the presence of a finger on the touchpad surface, and the pen 2 can now be used as a human interface device in combination with the touchpad 6. It should be noted that while the touchpad electronics interpret the increased charging time as an increase in capacitance, in reality, the capacitance of the electrodes has not changed.

Figure 2:
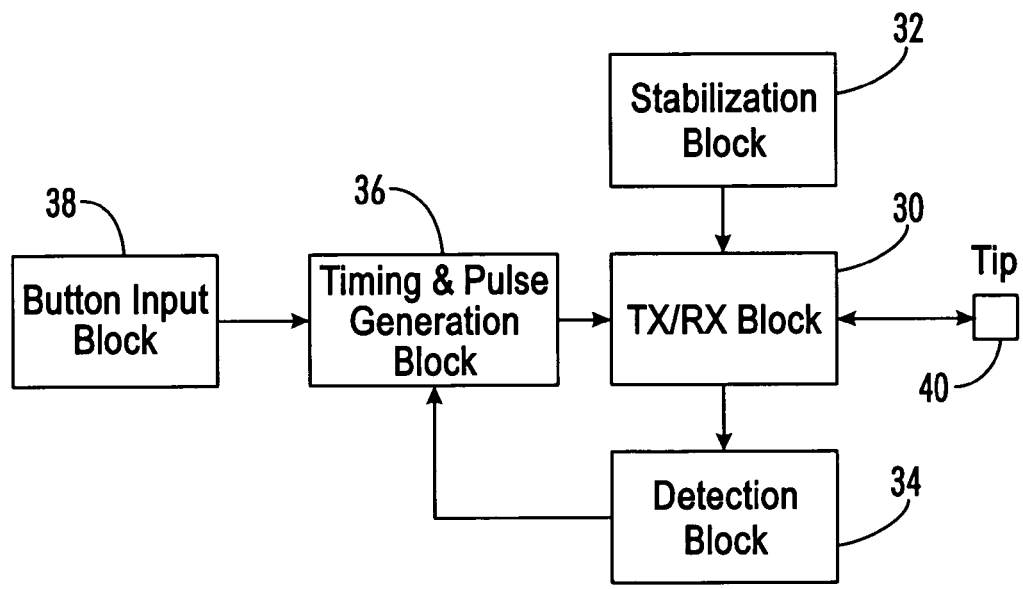
FIG. 2 is a block diagram of the trackpad pen's electronics.

Referring now to FIG. 2, a functional block diagram of the trackpad pen illustrating the various functions performed by the electronics of the Trackpad Pen and the directions of signal transfer between the various components is shown. The primary functional blocks of the Trackpad Pen are the Transmit & Receive block 30, the Stabilization Block 32, the Detection block 34, the Timing & Pulse Generation block 36, and the Button Input block 38. The power for the circuitry contained in each block is preferably obtained from an internal battery.

The purpose of the Transmit & Receive block 30 is to receive signals from the touchpad and transmit signals from the pen back to the touchpad. In accordance with a preferred embodiment of the present invention, this transmission takes place by way of capacitive coupling. Accordingly, the tip 40 of the Trackpad Pen is constructed of highly conductive metal such as copper. Using a highly conductive metal ensures that sufficient capacitance can be created between the tip 40 of the pen and the electrodes beneath the touchpad surface such that signals can couple capacitively back and forth between the touchpad and pen tip 40. Although the Trackpad Pen's tip 40 is highly conductive and adjacent conductors form capacitors, the surface area of the tip 40 is small enough that the presence of the tip 40 on the pad alone does not generate a sufficient increase in capacitance to be interpreted by the touchpad as the presence of a finger presence. Thus, an unpowered TrackPad Pen does not produce cursor motion.

The capacitance between the tip 40 of the pen and the electrodes beneath the touchpad is not a fixed quantity, but can be varied by adjusting the dielectric constant between the two ($\in$ in equation 2). One way this can be accomplished is by coating the tip of the pen with materials having varied dielectric constants. Different dielectric materials will result in different values of capacitance. The capacitance can also be varied by adjusting the surface area of the pen tip that contacts the touchpad. By appropriately shaping the tip, increased contact area can be achieved resulting in increased capacitance (increase in A in equation 2). The tip of the pen can also be constructed of different electrically conductive materials to adjust its conductivity properties, thereby achieving varied performance characteristics from the device as desired.

Figure 3:
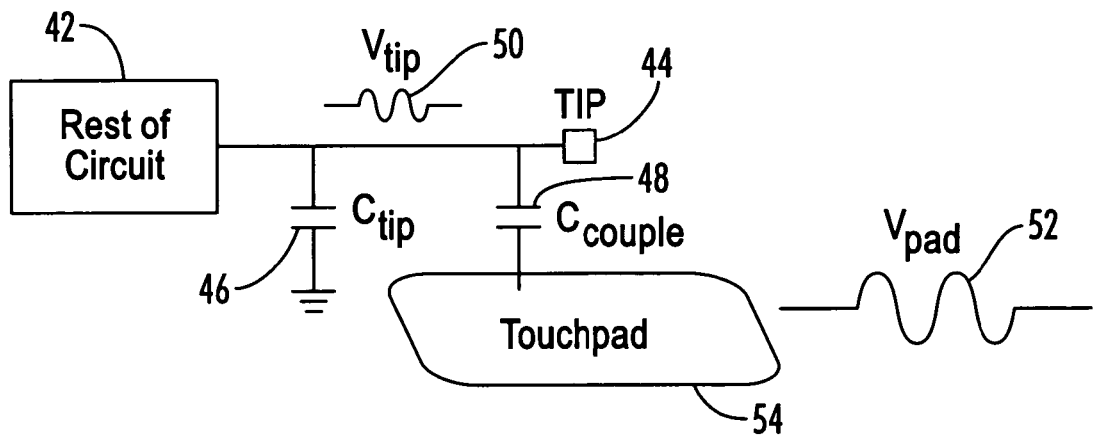
FIG. 3 is an illustration of the trackpad pen's capacitive coupling with a touchpad.

Additional characteristics of the Transmit & Receive Block 30 which are important to the operation of the pen are its impedance characteristics. The Transmit & Receive block 30 must present a high impedance to the pen tip, at the frequency of operation of the touchpad, in order to avoid dissipating the low-amplitude voltage signal coupling from the touchpad. As previously mentioned, this is a periodic, low-amplitude AC voltage signal at a fixed frequency and the capacitance connected to the tip of the pen must be kept to a minimum so that the signal's fidelity is not lost. Referring now to FIG. 3, the capacitance 46 present between the pen tip 44 and ground can be viewed as forming a capacitive voltage divider with the capacitance 48 between the touchpad electrodes 54 and pen tip 44. When viewed in this manner, the voltage 50 at the pen tip 44 in terms of the voltage 52 at the pad electrodes 54 is:

$$V_{tip}=V_{pad}*C_{couple}/(C_{couple}+C_{tip}) \quad (4)$$

where $V_{tip}$ is the voltage at the pen tip, $V_{pad}$ is the electrode voltage, $C_{couple}$ is the capacitance between the pen tip and touchpad, and $C_{tip}$ is the capacitance from the pen tip to ground. Clearly as $C_{tip}$ 46 increases, the voltage 52 coupled from the pad 54 to the pen decreases, so $C_{tip}$ 46 should be minimized for optimal performance. The rest of the circuit 42 is preferably buffered from the tip 44 to preserve the above describe relationship.

Figure 4:
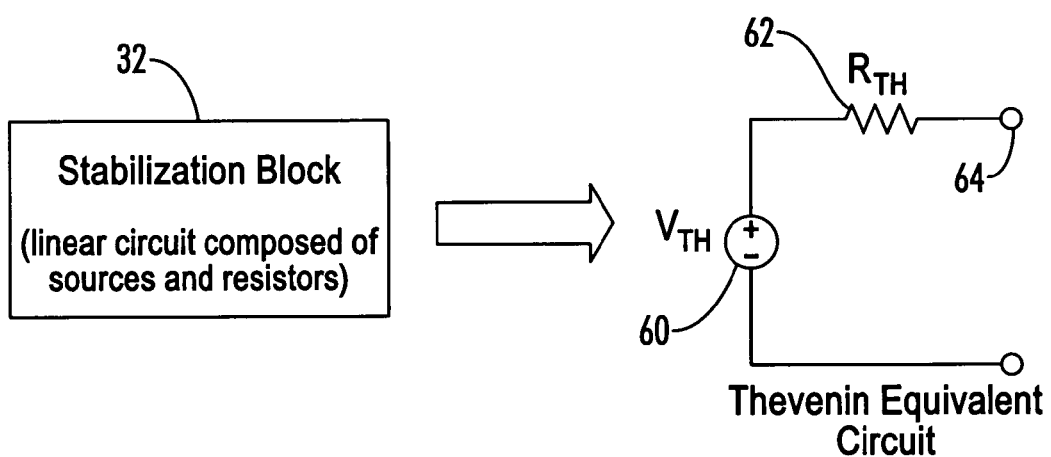
FIG. 4 is an illustration of a Thevenin equivalent circuit for the stabilization block of FIG. 3.

Cursor movement with the Trackpad Pen is achieved by coupling negative voltage transitions from the pen tip to the touchpad and the synchronization of these transitions with the rising edges of the touchpad signal. The stabilization block 32 is responsible for quickly stabilizing the tip 40 of the pen following these transitions by biasing it to a fixed voltage to provide an accurate and stable reference for detecting the AC voltage signal coupling from the touchpad. This biased-up signal is then fed to the detection block 34. The functionality of the stabilization block 32 is best illustrated using a Thévenin equivalent circuit. Referring now to FIG. 4, the Thévenin equivalent is a simple way of modeling a linear circuit composed of an arbitrary number of power sources and resistances as a single voltage source 60 and series resistance 62 view through a pair of output terminals 64. With regard to the pen, the Thévenin voltage 60 is the stabilization voltage that we want to bias the tip of the pen to, and the Thévenin resistance 62 is the equivalent source resistance of the stabilization circuit 32. The desired equivalent Thévenin resistance 62 of the stabilization circuit is set by two opposing factors. The resistance 62 needs to be small enough that after the negative voltage transition takes place such that the pen tip can be biased to the Thévenin voltage 60 and stabilized in time to detect the voltage signal coupling from the touchpad. At the frequencies typically employed by commercial touchpads, the amount of time available to accomplish this stabilization is just a few microseconds. This sets an upper bound on the resistance 62. The lower bound of the resistance 62 is such that the resistance 62 does not excessively load the voltage pulse generated by the Timing and Pulse Generation Block 36.

The AC voltage signal coupled to the pen from the touchpad is preferably a periodic, constant frequency signal with 50% duty cycle similar to a standard sinusoidal signal. In order to maintain the time synchronization necessary for proper operation, the pen must be able to reliably and repetitively trigger on a specific part of the AC voltage signal each cycle. To accomplish this, the detection circuitry 34 compares the AC voltage signal coupled from the touchpad, which is biased up to the small DC level set by the stabilization circuitry, to a reference voltage within the pen. When the falling edge of the biased-up touchpad signal falls below the threshold indicated by the voltage reference, a trigger signal is sent to the Timing and Pulse Generation Block 36. A comparator is one simple way of implementing this. An example of a falling edge in this application would be a −40 mV transition in 0.5 µs. The comparator threshold would be set between the initial and final voltages of the falling edge so that its output would switch during the transition. The switching output would serve as the trigger signal for the Timing & Pulse Generation block 36 to generate the large negative voltage transition.

The Timing & Pulse Generation block 36 is responsible for generating the negative voltage transitions that are coupled to the touchpad, and maintaining time synchronization between these transitions and the signals coupled from the touchpad to the pen. As mentioned in the previous section, the falling edge of the AC voltage signal coupled from the touchpad, when input to the Detection block 34, causes a trigger signal to be sent to the Timing and Pulse Generation block 36. Once the trigger signal is received, the Timing and Pulse Generation block 36 immediately generates a large positive voltage, in the range of 30-60V, and transfers it to the tip of the pen. Just before the next rising edge of the touchpad's AC voltage signal, the voltage at the pen tip is pulled back down to about 0V. This transition from a high to a low voltage is the negative transition that creates the desired simulation of the capacitive effect. One possible way of generating the high voltage pulse is by using a circuit similar to a boost converter commonly used in modern switching power supply designs. This type of circuit boosts a lower voltage to a higher voltage by converting the magnetic energy stored in charging an inductor to electric energy stored in a capacitor. The charging/discharging of the inductor is preferably accomplished using a FET (field-effect transistor).

The time duration for which the voltage at the pen tip must be held high (between 30-60V) is typically a few microseconds. However, this time duration is variable and depends on the timing. The voltage across the storage capacitor must not be allowed to decrease much during this time, or else the magnitude of the negative voltage transition will be decreased, reducing its effectiveness. This is the reason for the lower bound on the equivalent Thévenin resistance 62 of the stabilization circuit described above. This resistance 62 causes a discharging of the storage capacitor during the time that the tip voltage is high, and thus should not be too low in value.

In addition to generating the negative voltage transitions, the Timing and Pulse Generation block 36 maintains the synchronization of the signals. Since the touchpad's AC voltage signal operates at a fixed frequency and 50% duty cycle, the time between falling edges, which generate the trigger signals, and the subsequent rising edges can be easily computed. Using this information, the timing and pulse generation block 36 can determine the timing for the generation of the high voltage at the pen tip, and the timing of the subsequent negative voltage transition. The timing is such that the negative transition will be aligned with the rising edge of the touchpad signal for optimum performance. As an example consider a touchpad with an AC voltage signal operating at 50 kHz. This corresponds to a period of 20 μs. When the pen is initially placed on the touchpad, the Edge Detection block 34 sends a trigger to the Timing and Pulse Generation block 36 at each falling edge of the signal, which occurs once per period. The timing circuitry 36 uses several successive triggers to compute the period of the signal, in this case 20 μs, and then uses this information to set the timing for the generation of the high voltage at the pen tip, and the timing of the subsequent negative voltage transition. The timing will then remain fixed as long as the pen is in use on that particular touchpad or until the timing circuitry is reset.

The Button Input Block 38 is responsible for receiving user input to the Trackpad Pen, via button presses. When a button is pressed, a signal is sent to the Timing and Pulse Generation block 36 which determines which button was pressed, and then responds by generating a specific sequence of pulses (negative voltage transitions at certain time intervals). These pulse sequences are capacitively coupled to the touchpad via the Transmit & Receive block, 30 and then interpreted by Trackpad Pen application software residing in the computer monitoring the touchpad. The software determines, based on the pulse sequence, which button was pressed and then performs the corresponding command. These commands are preferably user-programmable within the Trackpad Pen application software, thereby offering a wide range of combinations and functions.

Figure 5:
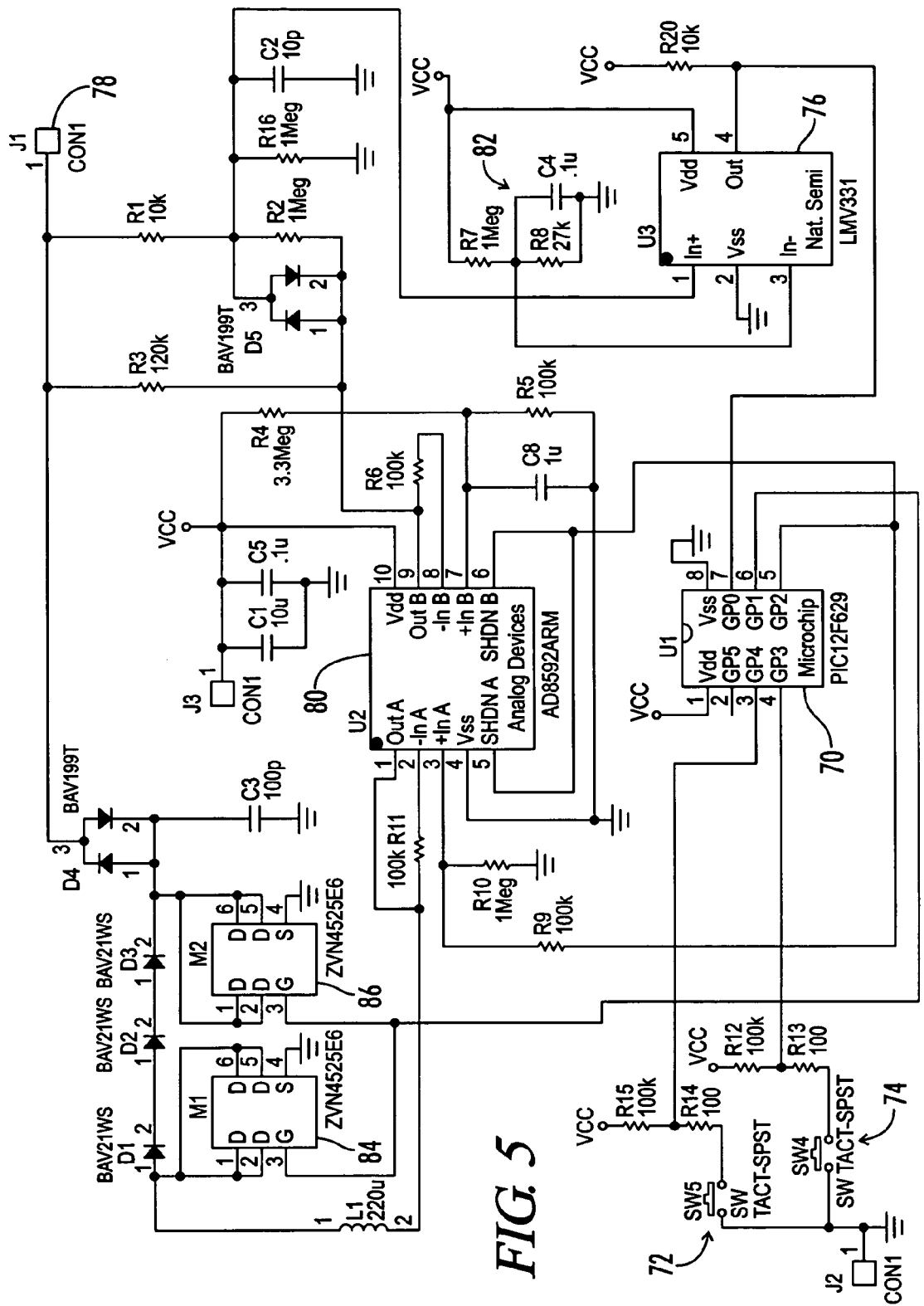
FIG. 5 is a schematic diagram of a TrackPad pen constructed in accordance with an embodiment of the present invention.

Referring now to FIG. 5, a schematic diagram of a TrackPad pen constructed in accordance with a preferred embodiment of the present invention is shown. The TrackPad pen is controlled by a microcontroller 70, such as the PIC12F629 offered by Microchip Technology. The microcontroller receives inputs from buttons 72 and 74, comparator 76, pen tip 78 and operational amplifier 80. The comparator 76, such as an LMV331 produced by National Semiconductor, is used to compare the coupled voltage from the touchpad to a reference voltage created by RC circuit 82. The operation amplifier 76, such as an AD8592ARM, is used to buffer signals received from, and transmitted to, the pen tip 66. MOSFETs 62 and 64 are used to generate the voltage signals that are coupled to the pen tip 78. Buttons 72 and 74 allow a user to input information in a manner similar to a right click/left click mouse buttons. Transistors 84 and 86 are used to generate the transmitted signals that are coupled to the touchpad. Those skilled in the art will appreciate that the circuit of FIG. 5 is exemplary only and that the present invention may be embodied in a large number of additional circuit configurations.

Although there have been described particular embodiments of the present invention of a new and useful TrackPad Pen for Use With a Computer Touchpad, it is not intended that such references be construed as limitations upon the scope of this invention except as set forth in the following claims.

Thus, although there have been described particular embodiments of the present invention of a new and useful Trackpad Pen for Use with Computer Touchpad, it is not intended that such references be construed as limitations upon the scope of this invention except as set forth in the following claims.

What is claimed is:

1. An accessory for use with a computer touchpad that uses a periodic AC signal coupled to at least one electrode of a capacitor to detect a change in charging time of the capacitor caused by a user's finger coming into contact with the computer touchpad, said accessory comprising:
   an approximately pen shaped housing;
   a conductive tip positioned on a tip of the pen shaped housing;
   a signal detector coupled to said conductive tip for detecting said periodic AC signal when said conductive tip is placed into contact with said computer touch pad;
   a signal generator for generating a negative voltage transition with respect to said detected periodic AC signal that is coupled to said computer touchpad through said conductive tip to increase a charge time of said capacitor in a manner that approximates an increase in charge time of the capacitor that results from the user's finger coming into contact with the computer touchpad.

2. The accessory of claim 1 further comprising a microcontroller for monitoring said signal detector and controlling said signal generator.

3. The accessory of claim 1 wherein said signal generator and said signal detector further comprise at least one transistor.

4. The accessory of claim 1 wherein said accessory further comprises application software residing on a computer coupled to said computer touchpad that interprets predetermined variations in said periodic AC signal produced by said signal generator as control signals for the computer.

5. The accessory of claim 1 wherein a computer monitoring said touchpad contains software that allows the computer to decode predetermined variations in said periodic AC voltage signal caused by said signal generator as data.

6. The accessory of claim 1 wherein said negative voltage transition is a transition between approximately 40 volts to 0 volts in less than approximately 1 μs.

* * * * *